US010372463B1

(12) United States Patent
Twomey et al.

(10) Patent No.: US 10,372,463 B1
(45) Date of Patent: Aug. 6, 2019

(54) PROVISIONING A COMPUTERIZED DEVICE WITH AN OPERATING SYSTEM

(71) Applicant: EMC Corporation, Hopkinton, MA (US)

(72) Inventors: Kevin P. Twomey, Cork (IE); Daniel J. Roche, Hanover, MA (US); Xiao Lou, Shanghai (CN); Thomas J. Kelly, Bandon (IE); Isaias A. Barinas, Cranston, RI (US); Frank T. Smith, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 683 days.

(21) Appl. No.: 14/091,735

(22) Filed: Nov. 27, 2013

(51) Int. Cl.
*G06F 9/4401* (2018.01)

(52) U.S. Cl.
CPC .......... *G06F 9/4416* (2013.01); *G06F 9/4406* (2013.01)

(58) Field of Classification Search
CPC .............................. G06F 9/4416; G06F 9/4406
USPC ........................................................ 709/222
See application file for complete search history.

(56) References Cited

U.S. PATENT DOCUMENTS

| | | | | | |
|---|---|---|---|---|---|
| 5,978,912 | A * | 11/1999 | Rakavy | ................. | G06F 9/4416 709/222 |
| 6,470,457 | B1 * | 10/2002 | Brewer | .................... | G06F 1/26 713/2 |
| 6,959,331 | B1 * | 10/2005 | Traversat | .............. | G06F 9/4416 709/222 |
| 7,721,138 | B1 * | 5/2010 | Lyadvinsky | ........ | G06F 11/1417 714/10 |
| 7,814,481 | B1 * | 10/2010 | Welder | .................. | G06F 15/177 713/2 |
| 9,064,117 | B1 * | 6/2015 | Worsley | .............. | G06F 11/1415 |
| 9,081,747 | B1 * | 7/2015 | Tabieros | ............... | G06F 15/177 |
| 2003/0084337 | A1 * | 5/2003 | Simionescu | .......... | G06F 9/4416 713/190 |

(Continued)

OTHER PUBLICATIONS

Wikipedia contributors. "Option ROM." Wikipedia, The Free Encyclopedia. Wikipedia, The Free Encyclopedia, May 15, 2018. Web. Aug. 22, 2018. <URL:https://en.wikipedia.org/wiki/Option_ROM>. (Year: 2018).*

*Primary Examiner* — Philip J Chea
*Assistant Examiner* — Wing Ma
(74) *Attorney, Agent, or Firm* — BainwoodHuang (57) ABSTRACT

A technique provisions a computerized device with a main operating system. The technique involves loading, while the computerized device operates as a preboot execution environment (PXE) protocol client, a limited boot image from a PXE server over a network (e.g., booting the limited boot image using the trivial file transfer protocol or TFTP). The technique further involves executing the limited boot image loaded from the PXE server to operate the computerized device as an advanced protocol provisioned client. The technique further involves downloading, while the computerized device executes the limited boot image to operate as the advanced protocol provisioned client, the main operating system into local memory from an operating system server over the network (e.g., booting the main operating system using the file transfer protocol or FTP). The computerized device may store a copy of the main operating system in a local non-volatile cache if available.

20 Claims, 5 Drawing Sheets

(56) References Cited

U.S. PATENT DOCUMENTS

| | | | |
|---|---|---|---|
| 2003/0126426 A1* | 7/2003 | Frye, Jr. | G06F 9/4416 713/2 |
| 2003/0169445 A1* | 9/2003 | Chu | H04L 67/02 358/1.15 |
| 2004/0163008 A1* | 8/2004 | Kim | H04L 69/40 714/4.1 |
| 2004/0230817 A1* | 11/2004 | Ma | G06F 21/6218 713/193 |
| 2005/0160256 A1* | 7/2005 | Huang | G06F 9/4416 713/2 |
| 2005/0213768 A1* | 9/2005 | Durham | G06F 21/57 380/278 |
| 2006/0047998 A1* | 3/2006 | Darcy | G06F 3/061 714/6.12 |
| 2006/0075284 A1* | 4/2006 | Skan | G06F 8/63 714/5.1 |
| 2006/0242395 A1* | 10/2006 | Fausak | G06F 9/4416 713/1 |
| 2007/0233955 A1* | 10/2007 | Luo | G06F 12/1416 711/115 |
| 2007/0245135 A1* | 10/2007 | Dickens | G06F 8/63 713/2 |
| 2008/0104252 A1* | 5/2008 | Henniger | H04L 67/142 709/227 |
| 2008/0155245 A1* | 6/2008 | Lipscombe | G06F 9/4416 713/2 |
| 2009/0132797 A1* | 5/2009 | Lo | G06F 9/4416 713/2 |
| 2009/0198805 A1* | 8/2009 | Ben-Shaul | G06F 9/4416 709/222 |
| 2009/0249119 A1* | 10/2009 | Sethumadhavan | G06F 11/1469 714/15 |
| 2009/0327683 A1* | 12/2009 | Cabot | G06F 9/4416 713/2 |
| 2010/0146256 A1* | 6/2010 | Luo | G06F 12/0638 713/2 |
| 2010/0174810 A1* | 7/2010 | Cain | G06F 9/4416 709/222 |
| 2010/0185842 A1* | 7/2010 | Yu | G06F 9/4406 713/2 |
| 2011/0119434 A1* | 5/2011 | Brown | G06F 8/65 711/103 |
| 2011/0173430 A1* | 7/2011 | Kacin | G06F 9/4416 713/2 |
| 2011/0238969 A1* | 9/2011 | Warkentin | G06F 9/441 713/2 |
| 2011/0320799 A1* | 12/2011 | Lam | G06F 8/63 713/2 |
| 2012/0072989 A1* | 3/2012 | Sakai | G06F 21/567 726/24 |
| 2012/0084601 A1* | 4/2012 | Lee | G06F 11/0712 714/15 |
| 2012/0102305 A1* | 4/2012 | Liang | G06F 9/4416 713/2 |
| 2012/0124419 A1* | 5/2012 | Matthew | G06F 9/4416 714/20 |
| 2012/0151202 A1* | 6/2012 | Clerc | G06F 12/02 713/2 |
| 2013/0024726 A1* | 1/2013 | Andrews | G06F 11/1469 714/15 |
| 2013/0152074 A1* | 6/2013 | Yeh | G06F 8/61 717/178 |
| 2013/0219161 A1* | 8/2013 | Fontignie | G06F 9/4401 713/2 |
| 2014/0068240 A1* | 3/2014 | Nightingale | G06F 9/4406 713/2 |
| 2014/0173268 A1* | 6/2014 | Hashimoto | G06F 11/0754 713/2 |
| 2014/0195791 A1* | 7/2014 | Teli | G06F 11/1417 713/2 |
| 2014/0215197 A1* | 7/2014 | Murray | G06F 9/4416 713/2 |
| 2014/0229665 A1* | 8/2014 | Ebsen | G11C 7/1072 711/104 |
| 2014/0237226 A1* | 8/2014 | Berlin | G06F 9/4411 713/2 |
| 2014/0298091 A1* | 10/2014 | Carlen | H04L 65/80 714/15 |
| 2015/0020060 A1* | 1/2015 | Bandakka | G06F 8/665 717/171 |
| 2015/0143170 A1* | 5/2015 | Andrews | G06F 11/1435 714/15 |

* cited by examiner

PROVISIONING A COMPUTERIZED DEVICE WITH AN OPERATING SYSTEM

BACKGROUND

A conventional electronic equipment manufacturer may impose a process of testing a new computer (or a new hardware processing module) prior to shipping the new computer to a customer. In one such conventional process, a human test administrator directs the new computer to boot an operating system from an operating system server over a network using the Preboot Execution Environment (PXE) protocol which utilizes the Trivial File Transfer Protocol (TFTP). The human test administrator then puts the new computer through a series of tests while the new computer runs that operating system. Details of the PXE protocol are provided in a document entitled "Preboot Execution Environment (PXE) Specification", Version 2.1, dated Sep. 20, 1999 offered by Intel Corporation of Santa Clara, Calif., the content and teachings of which are hereby incorporated by reference in their entirety.

In another conventional process, a human test administrator carries a universal serial bus (USB) memory stick (i.e., a portable flash memory drive) containing the operating system, and plugs the USB memory stick into a USB port of the new computer. The human test administrator then directs the new computer to boot the operating system from the USB memory stick, and then puts the new computer through the series of tests while the new computer runs the operating system.

SUMMARY

Unfortunately, there are deficiencies to the above-described conventional approaches to testing a new computer prior to shipping the new computer to a customer. For example, the above-described conventional PXE boot approach only works satisfactorily when the new computer is within close range of the operating system server (e.g., when the new computer and the operating system server reside on the same local area network, within the same test area, within the same facility, etc.). However, if the new computer and the operating system server are separated by relatively long distances (e.g., multiple network hops, miles, different cities, different states/countries, etc.), TFTP limitations can significantly increase the amount of time required to boot the new computer from the operating system server (e.g., from less than a minute to several hours). Accordingly, the above-described conventional PXE boot approach is not well suited for situations in which the new computer staging area is not located near the operating system server.

Furthermore, in the conventional PXE boot approach, each time the new computer is rebooted (e.g., due to routine resetting, during power cycle testing, etc.), the new computer re-boots the operating system from the operating system server. Such operation creates excessive network traffic and, when the operating system server is remote, adds significant latency to the process.

Moreover, the conventional PXE boot approach is completely dependent on the availability of the network. If the network somehow becomes unavailable, the new computer will be unable to boot, and the test process will remain at a standstill until the network becomes available again.

Additionally, the above-described conventional memory stick boot approach only works satisfactorily when each new computer requires the same operating system (i.e., the particular operating system stored on the USB memory stick carried by the human test administrator). However, in the context of a new computer staging facility, a single human test administrator may be required to test many new computers at a time, and the single human test administrator may be required to load different operating systems onto different new computers. In this situation, the human test administrator may be required to carry several different USB memory sticks containing the different operating systems. The task of sorting through different USB memory sticks in order to boot the correct operating system, the task of upgrading the different USB memory sticks with different operating system versions as new versions become available, and so on, is extremely burdensome on the human test administrator.

In contrast to the above-described conventional approaches, improved techniques are directed to provisioning a computerized device with an initial operating system by using PXE to equip the computerize device with a set of advanced protocols such as the File Transfer Protocol (FTP) and then downloading a main operating system to the computerize device using the set of advanced protocols. Such improved techniques still involve using PXE, i.e., to acquire the set of advanced protocols from a server. However, with the set of advanced protocols now available on the computerized device, subsequent downloading of the main operating system to the computerized device is relatively quick (e.g., using FTP) even if the computerized device and the source of the main operating system are separated by a large distance. Moreover, additional features can now be made available such as locally storing the operating system to a local non-volatile cache to locally boot the computerized device in the future to decrease boot time, reduce network traffic, and remove dependency on network availability. Furthermore, the main operating system can now be verified to ensure that it is intact (i.e., to verify that the main operating system is not corrupted, has not been tampered with, and so on).

One embodiment is directed to a method of provisioning a computerized device (e.g., a processing module having multiple processors, a physical storage processor, a blade, a motherboard, a complete computer, etc.) with a main operating system. The method includes loading, while processing circuitry of the computerized device operates as a PXE client, a limited boot image (e.g., a small intelligent boot loader) from a PXE server over a network. The method further includes executing, by the processing circuitry, the limited boot image loaded from the PXE server to operate the computerized device as an advanced protocol provisioned client. The method further includes downloading, while the processing circuitry of the computerized device executes the limited boot image to operate the computerized device as the advanced protocol provisioned client, the main operating system into local memory from an operating system server over the network.

In some arrangements, loading the limited boot image from the PXE server over the network includes retrieving the limited boot image from the PXE server via connectionless protocol communications such as TFTP.

In some arrangements, downloading the main operating system into the local memory from the operating system server over the network includes obtaining the main operating system from the operating system server via connection-oriented protocol communications such as FTP.

In some arrangements, loading the limited boot image from the PXE server over the network includes operating the computerized device in accordance with PXE Protocol Version 2.1. In some arrangements, the PXE server and the operating system server are co-located (e.g., reside on the same physical equipment, in the same facility, supported by the same data center, etc.). In other arrangements, the PXE server and the operating system server reside in different locations (e.g., reside in different geographical locations, are managed by different entities, etc.).

In some arrangements, acquiring the limited boot image using TFTP includes receiving, as the limited boot image, a lightweight operating system which is less than 1 Megabyte (MB) in size. Additionally, in some arrangements, acquiring the main operating system using FTP includes receiving, as the main operating system, a comprehensive operating system which is greater than 1 Gigabyte (GB) in size and which is different than the lightweight operating system.

In some arrangements, downloading the main operating system into the local memory includes sending a main operating system identification request message to a cloud boot service over the network, the main operating system identification request message requesting identification of a particular main operating system. In these arrangements, downloading the main operating system into the local memory further includes receiving a main operating system identification response from the cloud boot service over the network, the main operating system identification response uniquely identifying the particular main operating system among multiple main operating systems available from the operating system server.

In some arrangements, the main operating system identification response includes (i) a name of the particular main operating system and (ii) a version of the particular main operating system. In these arrangements, downloading the main operating system into the local memory further includes, based on the name and the version, retrieving the particular main operating system from the operating system server over the network and storing the particular main operating system in the local memory.

In some arrangements, the method further includes, after the particular main operating system is retrieved from the operating system server and stored in the local memory, automatically performing a reboot operation to boot the particular main operating system from the local memory.

In some arrangements, the local memory is volatile memory which stores the particular main operating system in a volatile manner. In these arrangements, the method further includes, while retrieving the particular main operating system from the operating system server over the network, saving a copy of the particular main operating system in a local non-volatile cache which stores the particular main operating system in a non-volatile manner.

In some arrangements, the method further includes saving a copy of the limited boot image in the local non-volatile cache. The local non-volatile cache is constructed and arranged to concurrently store the copy of the limited boot image and the copy of the particular main operating system.

In some arrangements, downloading the main operating system into the local memory further includes, prior to retrieving the particular main operating system from the operating system server, performing a search operation which, based on the name and the version, to search a local non-volatile cache for an intact copy of the particular main operating system, a result of the search operation indicating that an intact copy of the particular main operating system is not currently stored in the local non-volatile cache. In these arrangements, retrieving the particular main operating system from the operating system server is performed in response to the result of the search operation indicating that an intact copy of the particular main operating system is not currently stored in the local non-volatile cache.

In some arrangements, performing the search operation includes finding a corrupted copy of the particular main operating system in the local non-volatile cache, and performing a signature verification operation on the corrupted copy of the particular main operating system, the signature verification operation providing a signature value indicating that the corrupted copy of the particular main operating system is unsuitable for use by the computerized device. In these arrangements, retrieving the particular main operating system from the operating system server is performed in response to the signature value indicating that the corrupted copy of the particular main operating system is unsuitable for use by the computerized device.

In some arrangements, the method further includes, after sending the main operating system identification request message to the cloud boot service and prior to receiving the main operating system identification response, receiving a registration message from a cloud registration service. The registration message (i) indicates that an operating system assignment has been provided for the computerized device and (ii) directs the computerized device to resend the main operating system identification request message to the cloud boot service. In these arrangements, the method further includes, in response to the registration message, resending the main operating system identification request message to the cloud boot service over the network.

In some arrangements, the method further includes, prior to receiving the registration message from the cloud registration service, providing a hardware identifier to the cloud registration service. The hardware identifier uniquely identifies the computerized device to the cloud registration service to enable assignment of the particular main operating system to the computerized device.

In some arrangements, the method further includes, while loading the limited boot image from the PXE server over the network, saving a local copy of the limited boot image in a local non-volatile cache which is separate from the local memory. In these arrangements, the method further includes, while downloading the main operating system into the local memory from the operating system server over the network, saving a local copy of the main operating system in the local non-volatile cache.

In some arrangements, the method further includes, after the computerized device has been rebooted, detecting a network deficiency and, in response to detection of the network deficiency, loading the local copy of the limited boot image from the local non-volatile cache to operate the computerized device as the advanced protocol provisioned client.

In some arrangements, the method further includes, after loading the local copy of the limited boot image from the local non-volatile cache to operate the computerized device as the advanced protocol provisioned client, outputting an operating system list to a user of the computerized device. The operating system list identifies available main operating systems which are currently saved in the local non-volatile cache. In these arrangements, the method further includes providing a menu to the user of the computerized device, the menu prompting the user to select, from the operating system list, a particular available main operating system for booting on the computerized device.

Another embodiment is directed to an electronic apparatus which includes a network interface constructed and arranged to connect to a network; memory; and processing circuitry coupled to the network interface and the memory.

The memory stores instructions which, when carried out by the processing circuitry, cause the processing circuitry to:

(i) while the processing circuitry operates as a PXE client, load a limited boot image from a PXE server over the network, (ii) execute the limited boot image loaded from the PXE server to operate the electronic apparatus as an advanced protocol provisioned client, and (iii) while the processing circuitry executes the limited boot image to operate the electronic apparatus as the advanced protocol provisioned client, download a main operating system into the memory from an operating system server over the network.

Another embodiment is directed to a computer program product having a non-transitory computer readable medium which stores a set of instructions to provision a computerized device with a main operating system. The set of instructions, when carried out by computerized circuitry of the computerized device, causing the computerized circuitry to perform a method of:

(i) while computerized circuitry operates as a PXE client, loading, by the computerized circuitry, a limited boot image from a PXE server over a network, (ii) executing, by the computerized circuitry, the limited boot image loaded from the PXE server to operate the computerized device as an advanced protocol provisioned client, and (iii) while the computerized circuitry executes the limited boot image to operate the computerized device as the advanced protocol provisioned client, downloading, by the computerized circuitry, the main operating system into local memory from an operating system server over the network.

It should be understood that, in the cloud context, the electronic circuitry which forms one or more of the servers is formed by remote computer resources distributed over a network. Additionally, in one arrangement, the PXE server and the operating system server reside in the same machine. In another arrangement, the PXE server and the operating system server reside in separate machines. Such computing environments are capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in provisioning computerized devices with main operating systems.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to (i) provisioning a computerized device with an initial operating system by using the preboot execution environment (PXE) protocol to equip the computerize device with a set of advanced protocols such as the File Transfer Protocol (FTP) and (ii) downloading a main operating system to the computerize device using the set of advanced protocols. Such an improved technique still involves using PXE to acquire the set of advanced protocols (e.g., to load a limited boot image). However, with the set of advanced protocols now available on the computerized device, subsequent downloading of the main operating system to the computerized device is relatively quick (e.g., using FTP) even if the computerized device and the source of the main operating system are separated by a large distance. Furthermore, additional features can now be made available such as locally storing the operating system to a local non-volatile cache to locally boot the computerized device in the future and thus decrease boot time, reduce network traffic, and remove dependency on network availability. Additionally, the main operating system can now be verified (e.g., using a digital signature) to ensure that it is intact (i.e., to verify that the main operating system is not corrupted, has not been tampered with, and so on). Moreover, the computerized device can query an operating system server to select a particular main operating system among multiple available operating systems, and so on.

Figure 1:
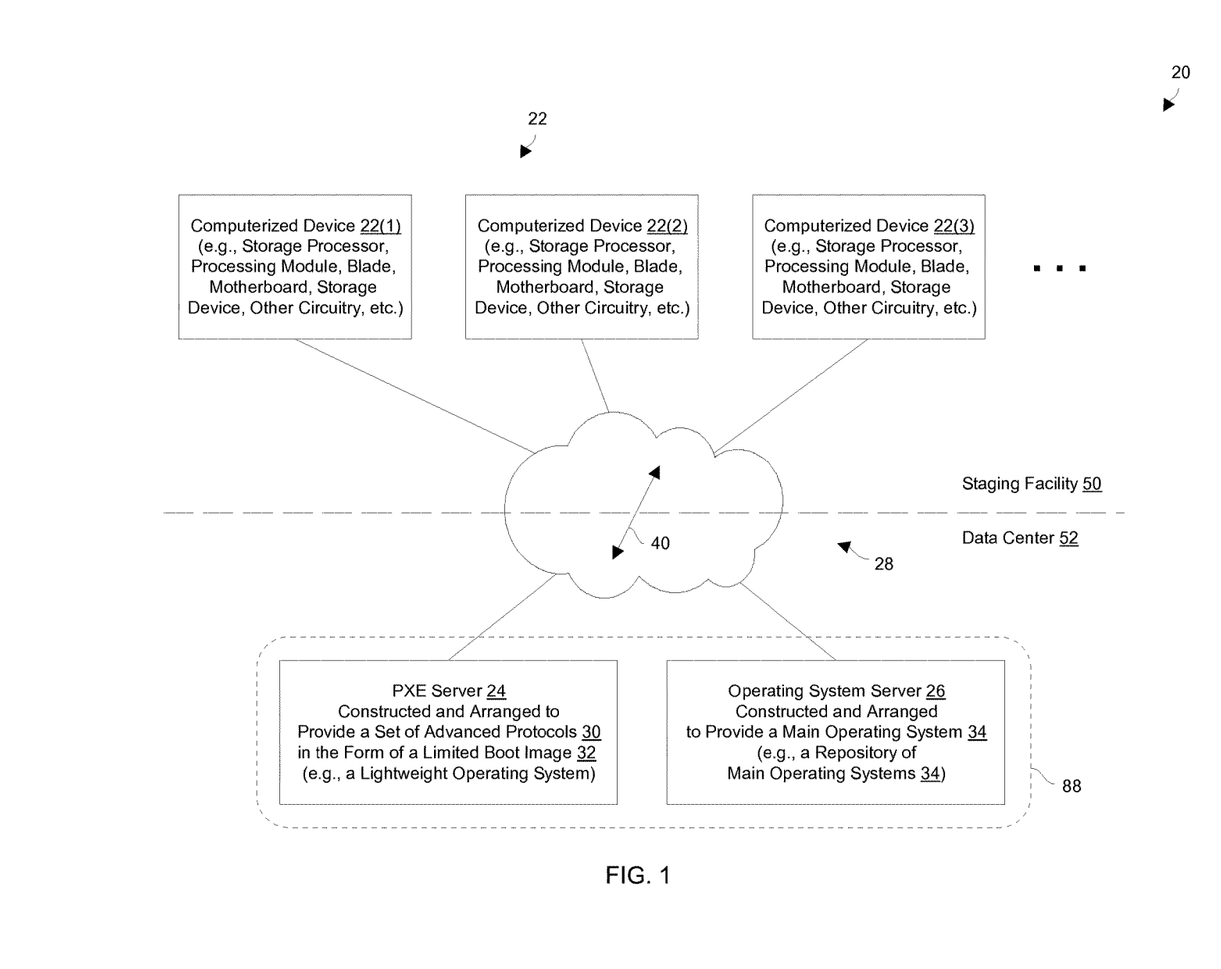
FIG. 1 is a block diagram of an electronic environment which provisions a computerized device with an operating system by (i) using the preboot execution environment (PXE) protocol to equip the computerize device with a set of advanced protocols such as the File Transfer Protocol (FTP) and then (ii) downloading the operating system to the computerize device using the set of advanced protocols.

FIG. 1 shows an electronic environment 20 which provisions a computerized device with an operating system by (i) using the PXE protocol to equip the computerize device with a set of advanced protocols (e.g., a small intelligent boot loader equipped with FTP) and then (ii) downloading the operating system to the computerize device using the set of advanced protocols. The electronic environment 20 includes computerized devices 22(1), 22(2), 22(3), . . . (collectively, computerized devices 22), a PXE server 24, an operating system server 26, and a communications medium 28.

Each computerized device 22 is constructed and arranged to load and execute code. Examples of such computerized devices 22 include storage processors (SPs), processing modules, blades, motherboards, computing appliances, storage devices, specialized circuit board modules, and the like. In some arrangements, the computerized devices 22 are not provisioned with local data storage drives (e.g., in the context of a manufacturing or staging facility, access to such storage may occur at a later time).

The PXE server 24 is constructed and arranged to provide a set of advanced protocols 30 in response to PXE boot requests. The set of advanced protocols 30 is in the form of a limited boot image 32 (e.g., a lightweight operating system) which enables the processing circuitry which executes the limited boot image to perform certain advanced operations such as file transfers using FTP. It should be understood that the limited boot image 32 is not only provisioned with advanced protocol support, but is also provisioned with additional intelligence (e.g., to cache content, to detect whether data is corrupted or tampered with, to interface with a user, etc.). Such features will be explained in further detail below.

The operating system server 26 is constructed and arranged to provide a main operating system 34 in response to an FTP request. In some arrangements, the operating system server 26 includes a repository which stores a variety of main operating systems 34 (e.g., Linux, Solaris, etc.).

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, a human user directs a computerized device 22 to use the PXE protocol to load the set of advanced protocols 30 from the PXE server 24. In response, the computerized device 22 operates as a PXE client and loads the limited boot image containing the set of advanced protocols 30 from the PXE server 24 using TFTP. Due to the lightweight nature of the limited boot image 32 (e.g., less than 1 Megabyte), the amount of time required to load the limited boot image 32 into the computerized device 22 from the PXE server 24 is relatively small. For example, even if the PXE server 24 and the computerized device 22 are disposed remotely from each other such as being separated by multiple hops, in different states/countries, etc., the amount of time required to boot the limited boot image 32 over the communications medium 28 can be under a minute. Moreover, as the computerized device 22 acquires the limited boot image 32, the computerized device 22 is capable of saving a copy of the limited boot image 32 in a local non-volatile cache if available (e.g., a flash memory drive or other local non-volatile storage).

Once the computerized device 22 has booted the limited boot image 32 (see the set of advanced protocols 30 in FIG. 1), the computerized device 22 is equipped to perform a variety of advanced operations. In particular, the computerized device 22 is now capable of operating as an advanced protocol provisioned client to communicate with remote servers and, if necessary, copy files using FTP from the remote servers over the communications medium 28. Along these lines, even if the operating system 30 is relatively large (e.g., over 1 Gigabyte in size), the computerized device 22 is capable of loading the main operating system 34 from the operating system server 26 in a relatively short amount of time (e.g., in under a minute, within a couple of minutes, etc.). In some arrangements, a special routine automatically begins once the limited boot image 32 is booted, and the special routine directs the computerized device 22 to load the main operating system 34. In other arrangements, the user manually launches or commands the special routine to load the main operating system 34.

At this point, it should be understood that the operating system server 26 is capable of storing a variety of main operating systems 34 (e.g., various versions of Linux, various versions of Solaris, etc.). Additionally, the operation system server 26 is capable of maintaining a registry of operating system assignments, i.e., pairings of particular computerized devices 22 to particular main operating systems 34.

As will be explained shortly and in further detail, each computerized device 22 communicates with the operating system server 26 through the communications medium 28 once that computerized device 22 is booted with the limited boot image 32. That is, each computerized device 22 initially registers with the operating system server 26 to receive an assigned main operating system 34, and then obtains an identification message identifying the assigned main operating system 34 (e.g., an operating system name and version). As part of this exchange, the computerized device 22 may provide a stable identifier such as a media access control (MAC) address, a product serial number or other hardware identifier. Once the computerized device 22 receives the identification message, the computerized device 22 acquires the assigned main operating system 34 from the operating system server 26.

As the computerized device 22 acquires the assigned main operating system 34, the computerized device 22 is capable of saving a copy of the main operating system 34 in a local non-volatile cache if available. In some arrangements, the computerized device 22 may have already saved a copy of the limited boot image 32 in the same local non-volatile cache.

It should be understood that local non-volatile caching of the main operating system 34 alleviates the need to re-download the main operating system 34 across the communications medium 28 after a restart. That is, any subsequent reboot process can be performed locally (e.g., to minimize network bandwidth, to decrease dependency on the network, etc.).

For example, suppose that the computerized device 22 is power cycled for testing purposes. In such a situation, the computerized device 22 initially operates as a PXE client and reloads the limited boot image 32 from the PXE server 24 over the communications medium 28. The computerized device 22 then executes the limited boot image 32 to operate as an advanced protocol client (i.e., a device with advanced protocol support). While operating as the advanced protocol client, the computerized device 22 contacts the operating system server 26. In particular, the computerized device 22 provides the stable identifier (e.g., its MAC address) and the operating system server 26 searches a registry of operating system assignments to determine whether the computerized device 22 has previously registered to obtain a main operating system assignment.

If the computerized device 22 has not previously registered, the computerized device 22 assigns a main operating system 34 to the computerized device 22. In some arrangements, the assignment operation involves the operating system server 26 contacting a separate electronic database (e.g., a sales order database, a manufacturing database, etc.) to lookup which main operating system 34 is to be loaded onto the computerized device 22. The operating system server 26 then logs the assignment in the registry and ultimately provides an operating system identification message to the computerized device 22 which identifies the assigned operating system 34 by name and version.

However, if the computerized device 22 has previously registered, the operating system server 26 simply finds the logged assignment from the registry. The operating system server 26 then returns the operating system identification message to the computerized device 22.

Upon receipt of the operating system identification message from the operating system server 26, the computerized device 22 searches any local non-volatile cache to determine whether the assigned operating system 34 is available locally. If the computerized device 22 finds a copy of the assigned operating system 34, the computerized device 22 performs a digital signature verification operation on the copy to determine whether the copy of the assigned operating system 34 is intact. Such operation is a safeguard against inadvertently running a corrupted copy of the operating system 34 and protects against malicious tampering. If the computerized device 22 does not find a copy of the assigned operating system 34 in the local non-volatile cache or if the digital signature verification operation on the copy fails, the computerized device 22 retrieves the assigned operating system 34 from the operating system server 26 through the communications medium 28.

With the computerized device 22 now running the main operating system 34, the user is able to direct the computerized device 22 to perform useful work. Along these lines, the user is able to configure/exercise the computerized device 22, to test the computerized device 22, to run applications, and so on.

It should be understood that when a flash memory stick is used for the local non-volatile cache, there is no pre-configuration required from the user. For some computerized devices 22, the same flash memory stick can be used on multiple computerized devices 22, i.e., each computerized device 22 uses the same flash memory drive (e.g., one at a time). Alternatively, each computerized device 22 may connect with a respective flash memory stick.

By way of example only, the electronic environment 20 is illustrated as being under control of a manufacturer. In particular, the computerized devices 22 reside in a staging (or testing) facility 50 of the manufacturer while the PXE server 24 and the operating system server 26 reside at a data center 52 of the manufacturer. At the staging facility 50, each computerized device 22(1), 22(2), 22(3), . . . is processed in the manner described above in order to be provisioned with a main operating system 34. Other environments are suitable as well such as at customer sites, at server farms, at different locations within enterprises/organizations, etc.

In this example, the data center 52 is where various code is maintained and distributed. Accordingly, the data center 52 may be at a location which is separate from the staging area 50. In some arrangements, the PXE server 24 and the operating system server 26 reside in the same machine at the data center 52. In another arrangement, the PXE server and the operating server reside in separate machines at the data center 52. In some arrangements, the data center 52 is cloud-based from the perspective of the staging facility 50. Further details will now be provided with reference to FIG. 2.

Figure 2:
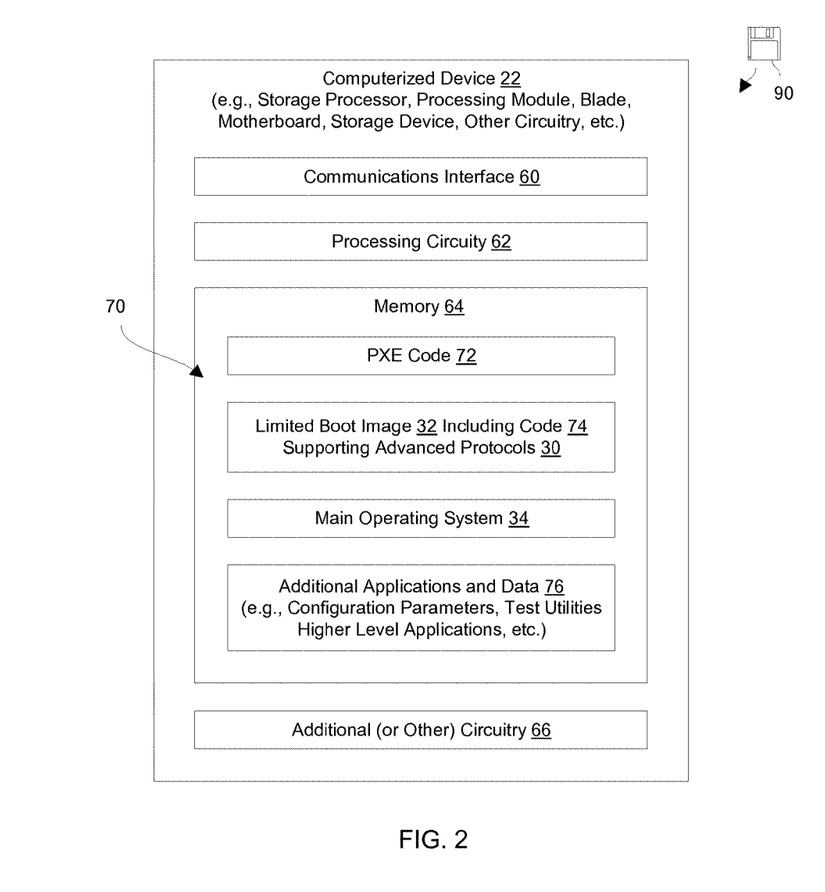
FIG. 2 is a block diagram of a computerized device of FIG. 1.

FIG. 2 shows particular details of a computerized device 22 (also see FIG. 1). The computerized device 22 includes a communications interface 60, processing circuitry 62, memory 64, and optionally other circuitry 66. The architecture and/or form factor of the computerized device 22 may be that of a single circuit board module or blade, multiple circuit boards, a card cage assembly, a computerized assembly or chassis, an electronic cabinet or enclosure, a complete computer system, a set of storage units or storage drives, a set of pluggable modules, and so on.

The communications interface 60 is constructed and arranged to connect the computerized device 22 to the communications medium 28 (also see FIG. 1). Accordingly, the communications interface 60 enables the computerized device 22 to communicate with the other components of the electronic environment 20 such as the PXE server 24 and the operating system server 28 through the communications medium 28. Such communications may be copper-based or wireless (i.e., IP-based, SAN-based, cellular, Bluetooth, combinations thereof, and so on).

The processing circuitry 62 is constructed and arranged to operate in accordance with the various software constructs stored in the memory 64. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

The memory 64 is intended to represent both volatile storage (e.g., DRAM, SRAM, etc.) and/or non-volatile storage (e.g., flash memory, magnetic disk drives, etc.). The memory 66 is constructed and arranged to store a variety of software constructs 70 including PXE code 72 enabling the computerized device 22 to initially operate as a PXE client (e.g., PXE firmware), the limited boot image 32 including advanced protocol code 74 which supports the advanced protocols 30 once the limited boot image 32 is obtained from the PXE server 24 (FIG. 1), a main operating system 34 once the main operating system 34 is obtained from the operating system server 26 (FIG. 1), and additional applications and data 76 (e.g., configuration parameters such as a MAC address/serial number/identifier/etc., test utilities, high level applications, and so on). Some of these constructs 70 can be downloaded to the memory 64 from remote servers and then maintained in the memory 64.

As mentioned above, the memory 64 can include various types of memory such as local main memory (i.e., primary memory for holding the limited boot image 32 and later the main operating system 34 during runtime), and a local non-volatile cache (i.e., to hold copies of the limited boot image 32 and the main operating system 34 during power cycles). In the context of a manufacturing/test facility, the local main memory may ultimately ship with the computerized device 22, while the local non-volatile cache may ship with the computerized device 22 or may be reused on another computerized device 22.

The optional additional circuitry 66 represents additional hardware that may be included with the computerized device 22. For example, the computerized device 22 may be equipped with a variety of input/output circuitry such as a USB port, a console port, host bus adapter (HBA) circuitry, etc. Along these lines, the USB port conveniently enables a user to locally provision the computerized device 22 with the a local non-volatile cache (e.g., the user can connect a flash memory drive to the USB port thus effectively integrating the flash memory drive with the computerized device 22). Additionally, the console port conveniently enables a console or control terminal to be connected to the computerized device 22, and so on. Furthermore, the HBA circuitry enables the computerized device 22 to connect to one or more storage arrays. The optional additional circuitry 66 may include other hardware as well.

It should be understood that, during operation, a computer program product 90 is capable of delivering at least some of the software constructs 70 to the computerized device 22. The computer program product 90 has a non-transitory (or non-volatile) computer readable medium which stores a set of instructions which controls one or more operations of the computerized device 22. Examples of suitable computer readable storage media include tangible articles of manufacture and apparatus which store instructions in a non-volatile manner such as CD-ROM, flash memory, disk memory, tape memory, and the like. Further details will now be provided with reference to FIGS. 3 and 4.

Figure 3:
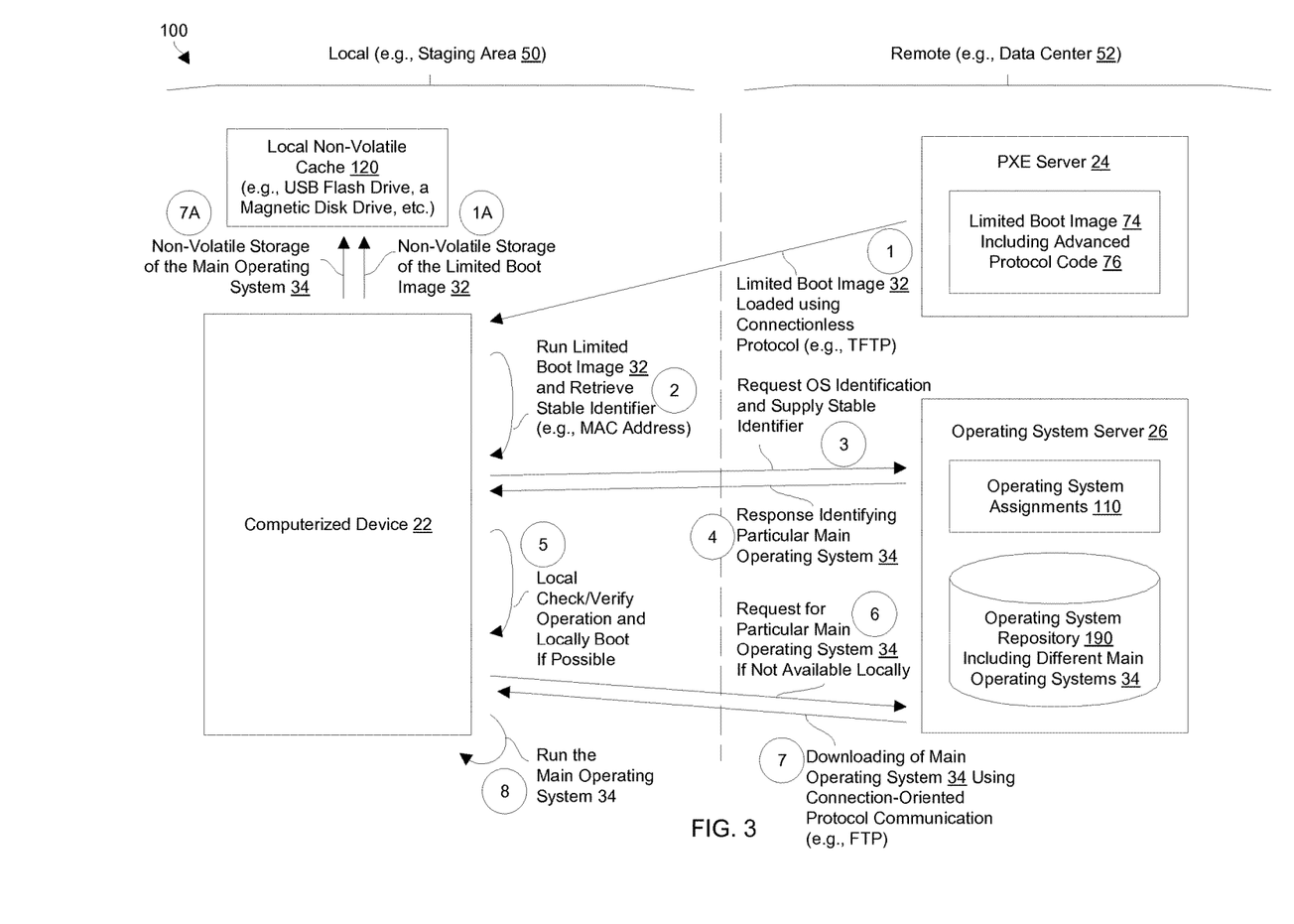
FIG. 3 is a block diagram of the computerized device of FIG. 2 interacting with a PXE server and an operating system server.
Figure 4:
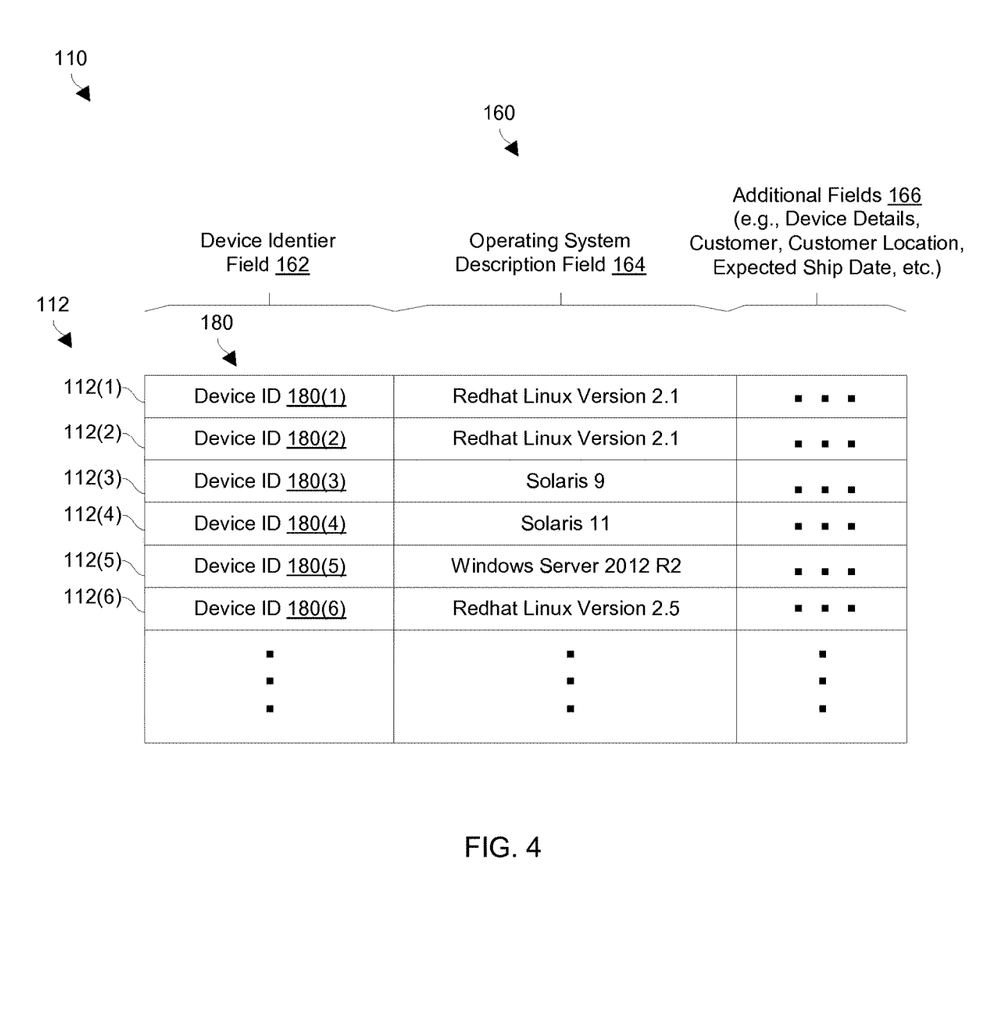
FIG. 4 is a block diagram of an electronic data structure which is utilized by the electronic environment of FIG. 1.

FIGS. 3 and 4 illustrate particular details of the interaction between various components of the electronic environment 20 (also see FIG. 1). In particular, FIG. 3 shows a series of communications 100 (steps 1 to 8) which are involved in provisioning a computerized device 22 with a particular main operating system 34 (also see FIG. 2). FIG. 4 shows a set (or registry) 110 of operating system assignments 112 which control selection of the particular main operating system 34 that is loaded into the computerized device 22.

As shown in FIG. 3, provisioning begins with the computerized device 22 loading the limited boot image 32 into its memory 64 (step 1) from the PXE server 24 through the communications medium 28 using the PXE protocol (also see FIGS. 1 and 2). In particular, the computerized device 22 operates as a PXE client (e.g., running the PXE code 72) and retrieves the limited boot image 32 from the PXE server 24 using TFTP and stores the limited boot image 32 in local primary memory (i.e., volatile main memory, also see FIG. 2). Such operation takes relatively little time (e.g., less than a minute) and consumes relatively little network bandwidth since the size of the limited boot image 32 is extremely small (e.g., less than 1 Megabyte).

It should be understood that the computerized device 22 may further include a local non-volatile cache 120 (e.g., a flash memory drive, a magnetic disk drive, etc.) in addition to local primary memory. In these situations, the computerized device 22 saves a copy of the limited boot image 32 in the non-volatile cache 120 for possible use in the future (step 1A).

It should be understood that the local non-volatile cache 120 (e.g., a flash memory drive) does not need to be preconfigured. Moreover, if space is available in local non-volatile cache 120, the limited boot image 32 may be stored alongside other previously stored main operating systems 34 (e.g., from staging/testing of one or more prior computerized devices 22).

With the limited boot image 32 now in local primary memory, the computerized device 22 boots the limited boot image 32 (step 2). Accordingly, the computerized device 22 is now provisioned with the advanced protocols 30 and is capable of performing more sophisticated operations. That is, the computerized device 22 operates as an advanced protocol client.

Next, the computerized device 22 reads a stable unique identifier (e.g., a MAC address, a serial number, some other hardware identifier, etc.) from its memory 64 (FIG. 2) and provides an operating system identification request including the unique identifier to a cloud boot service of the operating system server 26 (step 3). The unique identifier uniquely identifies the particular computerized device 22 among other computerized devices 22 in the electronic environment 20. The cloud boot service of the operating system server 26 ultimately responds by providing an operating system identification response which accurately identifies (e.g., via operating system name and version) a particular operating system 34 assigned to the computerized device 22.

FIG. 4 shows a set 110 of operating system assignments 112 which the operating system server 26 maintains in order to inform computerized devices 22 of which operating system 32 they are to run. By way of example only, the operating system assignments 112 are arranged into a list of assignment entries 112(1), 112(2), 112(3), . . . . Each assignment entry 112 includes a set of fields 160, namely, a device identifier field 162 to hold a respective device identifier 180 which identifies a particular computerized device 22, an operating system description (or operating system identifier) field 164 to identify a particular main operating system 34 to be downloaded to that particular computerized device 22, and additional fields 166 to hold additional data (e.g., configuration details of that particular computerized device 22, a customer, a customer location, an expected ship date, and so on). Accordingly, each assignment 112 pairs a particular computerized device 22 to a particular main operating system 34. It should be understood that other suitable formats are available for organizing the assignments 112 as well such as a spreadsheet, a relational database, and so on.

By way of example, the assignment entry 112(1) assigns Redhat Linux Version 2.1 to the computerized device 22 having device identifier 180(1). Similarly, the assignment entry 112(2) assigns Redhat Linux Version 2.1 to the computerized device 22 having device identifier 180(2), the assignment entry 112(3) assigns Solaris 9 to the computerized device 22 having device identifier 180(3), and so on.

In some arrangements, the set 110 of operating system assignments 112 is preloaded with a respective assignment 112 for each computerized device 22 to be processed during a particular time period. Accordingly, the cloud boot service is always able to immediately return a response identifying a particular main operating system 34 to the computerized device 22 (step 4).

However, in other arrangements, the cloud boot service of the operating system server 26 performs a discovery operation when it encounters a new unique identifier of a new computerized device 22. That is, when a new computerized device 22 sends an operating system identification request including the unique identifier to the operating system server 26 (step 3), the cloud boot service of the operating system server 26 searches the set 110 of assignments 112 for the unique identifier. If there are no assignments 112 having the unique identifier (see device IDs 180 in the device identifier fields 162 of the assignments 112 in FIG. 4), the cloud boot service initially informs the new computerized device 22 that there is no assigned main operating system 34. Next, the new computerized device 22 communicates with a discovery service of the operating system server 26 by providing the unique identifier and waiting for the discovery service to register the computerized device 22. Such registration may involve, based on the unique identifier, the discovery service (i) querying a separate database (e.g., a sales/purchase order database, a manufacturing schedule, and inventory list, etc.) to identify which main operating system 34 is to be loaded onto the new computerized device 22, and (ii) adding a new assignment 112 to the set 110 of assignments 112 based on the query. Once the new computerized device 22 has been registered, the discovery service directs the new computerized device 22 to resend an operating system identification request including the unique identifier to the cloud boot service of the operating system server 26 (i.e., repeat step 3). This time, the cloud boot service finds an assignment 112 with the unique identifier and returns a response identifying a particular main operating system 34 to the computerized device 22 (step 4).

In some arrangements, the response in step 4 identifies the particular main operating system 34 by name and version (e.g., "Redhat Linux 2.5"). In other arrangements, the response in step 4 identifies the particular main operating system 34 differently (e.g., via unique operating system identifier, via a truncated character string, and so on).

Upon receipt of the response which identifies the particular main operating system 34 assigned to the computerized device 22, the computerized device 22 performs a search/verification operation to determine whether the particular main operating system 34 is available locally (step 5). In particular, if the computerized device 22 finds a local copy of the particular main operating system 34 in a local non-volatile cache 120, the computerized device 22 performs an integrity check to verify that the particular main operating system 34 is intact (e.g., to confirm that the particular main operating system 34 is not corrupted or tampered with). If the particular main operating system 34 is available locally and intact, the computerized device 22 reboots using the discovered local main operating system 34. Such operation alleviates the need to consume further network bandwidth. A digital signature mechanism such as MD5, or the like, is suitable for enabling the computerized device 22 to determine authenticity of the main operating system 34 (e.g., the limited boot image 32 provides the computerized device 22 with the ability to evaluate the digital signature of the locally found main operating system 34). Verification mechanisms other than digital signing are suitable for use as well.

However, if the particular main operating system 34 is not available locally or is not intact, the computerized device 22 sends a request for the particular main operating system 34 to the cloud boot service of the operating system server 26 (step 6). In some arrangements, the computerized device 22 identifies the particular main operating system 34. In other arrangements, the computerized device 22 re-provides the device identifier 180. In yet other arrangements, the computerized device 22 (i) identifies the particular main operating system 34 and (ii) re-provides the device identifier 180.

In response to the request, the operating system server 26 finds the particular main operation system 34 in its operating system repository 190, and then returns the particular main operating system 34 to the computerized device 22 (step 7). Since the computerized device 22 now operates as an advanced protocol provisioned client, the computerized device 22 is equipped with FTP and downloads the particular main operating system 34 from the operating system server 26 using FTP which is an efficient connection-oriented protocol. It should be understood that the main operating system 34 can be a relatively large full blown operating system (e.g., greater than 200 MB, 500 MB, 1 GB, etc.) but nevertheless be efficiently and effectively downloaded over the communication medium 28 (FIG. 1) within a few minutes or less even (e.g., less than a minute) if the computerized device 22 and the operating system server 26 are separated by a large distance (e.g., several network hops, miles, different states/countries, etc.). Accordingly, the limited boot image 32 can be viewed by some perspectives as a small intelligent boot loader which enables the computerized device 22 to pull down the main operating system 34 from the operating system server 26 using a more reliable and robust FTP channel vis-à-vis TFTP.

If the local non-volatile cache 120 is available to store the particular main operating system 34 as the particular main operating system 34 is being downloaded through the communications medium 28, the computerized device 22 may store the particular main operating system 34 locally in a non-volatile manner (step 7A). In some arrangements, the computerized device 22 stores the particular main operating system 34 in the same flash memory drive that stores the limited boot image 32 (see step 1A earlier described above). As a result, provided that the locally stored main operating system 34 remains intact within the local non-volatile cache 120, the computerized device 22 can boot from the locally stored main operating system 34 in the future (e.g., after power cycling) without having to re-download the main operating system 34 from the operating system server 26 (steps 6 and 7). Such operation reduces over reliance of the communications medium 28. Furthermore, as long as space is available, the limited boot image 32 may be stored alongside other previously stored main operating systems 34 (e.g., from staging/testing of one or more prior computerized devices 22).

In some arrangements, the various components of the electronic environment 20 re-perform steps 1-4 (see above) even if the particular main operating system 34 is locally stored in a non-volatile manner. Such operation enables a new main operating system 34 to be specified, e.g., by modifying the assigned main operating system 34 in the appropriate assignment entry 112 for the computerized device 22 (see FIG. 4). Along these lines, the data center 52 may impose a change order while the computerized device 22 is being configured and tested at the staging facility 50, or the manufacturer may have recently decided to support a new operating system 34 or a new version, and so on. Such operation thus uses significant network bandwidth only during initial downloading of the main operating system 34 and, on occasion when the main operating system 34 is updated.

Once the computerized device 22 has the main operating system 34 intact, the computerized device 22 restarts using the main operating system 34 (step 8). In some arrangements, the computerized device 22 automatically reboots using the main operating system 34 (e.g., a utility of the limited boot image 74 can be set to auto reboot once the main operating system 34 is completely downloaded to the computerized device 22). Such operation alleviates the need for the user to enter a manual command to boot the main operating system 34 which could be burdensome as well as slow down the operating system provisioning process.

Alternatively, the computerized device 22 can await a command from the user before rebooting using the main operating system 34. This arrangement enables the user to have more control over the provisioning process. For example, the user may wish to modify certain default parameters or run certain utilities/tests/etc. prior to rebooting using the main operating system 34. Further details will now be provided with reference to FIG. 5.

Figure 5:
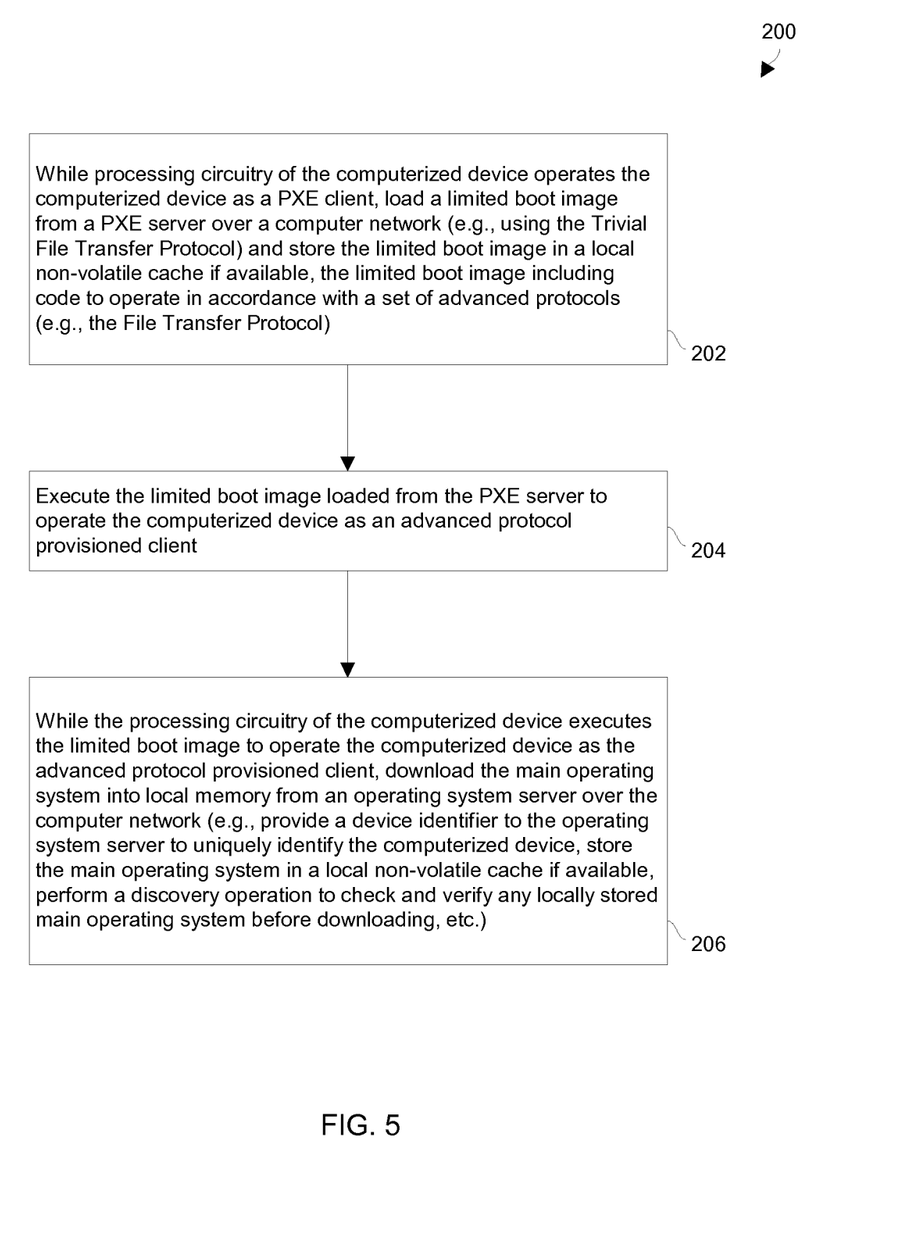
FIG. 5 is a flowchart of a procedure which is performed by the computerized device of FIG. 2.

FIG. 5 is a flowchart of a procedure 200 which is performed by a computerized device 22 when being provisioned with a main operating system 34. At 202, the computerized device 22 loads the limited boot image 32 from a PXE server 24 over a computer network while running the PXE code 72 to operate as a PXE client. In particular, the PXE code 72 equips the computerized device 22 to obtain the limited boot image 32 using TFTP, a connectionless communications protocol.

At 204, the computerized device 22 executes the limited boot image 32 loaded from the PXE server 24 to operate the computerized device 22 as an advanced protocol provisioned client. That is, the computerized device 22 is now able to operate using more sophisticated protocols (e.g., FTP) and perform more advanced operations.

At 206, the computerized device 22, while executing the limited boot image 32 to operate as the advanced protocol provisioned client, downloads the main operating system 34 into local memory from an operating system server 26 over the computer network. In particular, the limited boot image 32 equips the computerized device 22 to obtain the main operating system 34 using FTP, a connection-oriented communications protocol.

In some arrangements, the computerized device 22 stores the main operating system 34 in a non-volatile local cache 120 to alleviate the need to re-download the same main operating system 34 over the network in the future (e.g., after power cycling). In some arrangements, the computerized device 22 nevertheless communicates with the operating system server 26 to identify the proper operating system 34 to boot (e.g., based on the MAC address of the computerized device 22) prior to booting the main operating system 34 (e.g., to determine whether a new operating system or version has been assigned to the computerize device 22). In some arrangements, the operating system server 26 includes a repository 190 (FIG. 3) holding different main operating systems 34 and provides the particular main operating system 34 assigned specifically to that computerized device 22 (e.g., by choosing the particular operating system 34 from among an operating system identifier/description which is mapped to the computerized device 22 identifier on an electronic assignment list, also see FIG. 4).

As described above, improved techniques are directed to provisioning a computerized device 22 with an initial operating system 32 by using the PXE protocol to equip the computerize device 22 with a set of advanced protocols 30 such as FTP and then downloading a main operating system 34 to the computerized device 22 using the set of advanced protocols 30. Such improved techniques still involve using the PXE protocol, i.e., to acquire the set of advanced protocols 30 from a server 24. However, with the set of advanced protocols 30 now available on the computerized device 22, subsequent downloading of the main operating system 34 to the computerized device 22 is relatively quick (e.g., using FTP) even if the computerized device 22 and the source 26 of the main operating system 34 are separated by a large distance. Moreover, additional features can now be made available such as locally storing the main operating system 34 to a local non-volatile cache 120 to locally boot the computerized device 22 in the future to decrease boot time, reduce network traffic, and remove dependency on network availability. Furthermore, the main operating system 34 can now be verified to ensure that it is intact (i.e., to verify that the main operating system 34 is not corrupted, has not been tampered with, and so on).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Furthermore, it should be understood that the limited boot image 32 that is obtained from the PXE server 24 can be stored in non-volatile memory at the computerized device 22 if such non-volatile memory is available. For example, the limited boot image 32 could be stored in the same flash memory drive that stores the main operating system 34. Moreover, the integrity of the limited boot image 32 can be verified in the same manner as that of locally stored versions of the main operating system 34 (e.g., via digital signatures). Directing the computerized device 22 to communicate with the PXE server 24 prior to loading the limited boot image 32 enables version control over the limited boot image 32 (e.g., the computerized device 22 can be provided with a new version of the limited boot image 32 if the computerized device 22 communicates with the operating system server 26 at the start of each process, also see steps 4-5 in FIG. 3). Also, locally storing the limited boot image 32, when possible, minimizes network traffic and improves startup time (i.e., less latency).

Additionally, if the computerized device 22 is unable to communicate with either the PXE server 24 or the operating system server 26 (e.g., the network is down, a service is down, etc.), the computerized device 22 can locally boot from what is available on the local non-volatile cache 120 (FIG. 3). For example, suppose that the network is down but the limited boot image 32 is available on the local non-volatile cache 120. In such a situation, a user is able to locally boot the limited boot image 32 from the local non-volatile cache 120. With the computerized device 22 now provisioned with advanced features, the computerized device 22 provides the user with list of available main operating systems 34 locally stored in the local non-volatile cache 120. Along these lines, other main operating systems 34 may have been stored in the local non-volatile cache 120 from staging/testing other computerized devices 22. The user is able to then select and locally boot a main operating system 34 from the list. Accordingly, the improved techniques are less dependent on server communications (e.g., network availability) since staging and testing can still be performed when server communications become unavailable. Such modifications and enhancements are intended to belong to various embodiments of the disclosure.

What is claimed is:

1. A method of provisioning a computerized device with a main operating system, the method comprising:
   while processing circuitry of the computerized device operates as a preboot execution environment (PXE) protocol client, loading, by the processing circuitry, a limited boot image from a PXE server over a network, the limited boot image being a lightweight operating system;
   executing, by the processing circuitry, the limited boot image loaded from the PXE server to operate the computerized device as an advanced protocol provisioned client; and
   while the processing circuitry of the computerized device executes the limited boot image to operate the computerized device as the advanced protocol provisioned client, downloading, by the processing circuitry, the main operating system into local memory from an operating system server over the network, the main operating system being a comprehensive operating system;
   wherein the main operating system is a particular main operating system;
   wherein downloading the main operating system into the local memory further includes:
   prior to retrieving the particular main operating system from the operating system server, performing a search operation based on a name and version to search a local non volatile cache for an intact copy of the particular main operating system, a result of the search operation indicating that an intact copy of the particular main operating system is not currently stored in the local non volatile cache;

and wherein retrieving the particular main operating system from the operating system server is performed in response to the result of the search operation indicating that an intact copy of the particular main operating system is not currently stored in the local non volatile cache.

2. A method as in claim 1 wherein loading the limited boot image from the PXE server over the network includes retrieving the limited boot image from the PXE server via connectionless protocol communication; and wherein downloading the main operating system into the local memory from the operating system server over the network includes obtaining the main operating system from the operating system server via connection-oriented protocol communication.

3. A method as in claim 2 wherein retrieving the limited boot image from the PXE server via the connectionless protocol communication includes acquiring the limited boot image using Trivial File Transfer Protocol (TFTP); and wherein obtaining the main operating system from the operating system server via connection-oriented protocol communication includes acquiring the main operating system using File Transfer Protocol (FTP) which is different than TFTP.

4. A method as in claim 3 wherein acquiring the limited boot image using TFTP includes receiving, as the limited boot image, the lightweight operating system which is less than 1 Megabyte (MB) in size; and wherein acquiring the main operating system using FTP includes receiving, as the main operating system, the comprehensive operating system which is greater than 1 Gigabyte (GB) in size and which is different than the lightweight operating system.

5. A method as in claim 1 wherein downloading the main operating system into the local memory includes:

sending a main operating system identification request message to a cloud boot service over the network, the main operating system identification request message requesting identification of the particular main operating system, and receiving a main operating system identification response from the cloud boot service over the network, the main operating system identification response uniquely identifying the particular main operating system among multiple main operating systems available from the operating system server.

6. A method as in claim 5 wherein the main operating system identification response includes (i) a name of the particular main operating system and (ii) a version of the particular main operating system; and wherein downloading the main operating system into the local memory further includes:

based on the name and the version, retrieving the particular main operating system from the operating system server over the network and storing the particular main operating system in the local memory.

7. A method as in claim 6, further comprising:

after the particular main operating system is retrieved from the operating system server and stored in the local memory, automatically performing a reboot operation to boot the particular main operating system from the local memory.

8. A method as in claim 1, wherein performing the search operation includes:

finding a corrupted copy of the particular main operating system in the local non-volatile cache, and performing a signature verification operation on the corrupted copy of the particular main operating system, the signature verification operation providing a signature value indicating that the corrupted copy of the particular main operating system is unsuitable for use by the computerized device;

and wherein retrieving the particular main operating system from the operating system server is performed in response to the signature value indicating that the corrupted copy of the particular main operating system is unsuitable for use by the computerized device.

9. A method as in claim 6, further comprising:

after sending the main operating system identification request message to the cloud boot service and prior to receiving the main operating system identification response, receiving a registration message from a cloud registration service, the registration message (i) indicating that an operating system assignment has been provided for the computerized device and (ii) directing the computerized device to resend the main operating system identification request message to the cloud boot service, and in response to the registration message, resending the main operating system identification request message to the cloud boot service over the network.

10. A method as in claim 9, further comprising:

prior to receiving the registration message from the cloud registration service, providing a hardware identifier to the cloud registration service, the hardware identifier uniquely identifying the computerized device to the cloud registration service to enable assignment of the particular main operating system to the computerized device.

11. A method as in claim 1, further comprising:

after loading the local copy of the limited boot image from the local non-volatile cache to operate the computerized device as the advanced protocol provisioned client, outputting an operating system list to a user of the computerized device, the operating system list identifying available main operating systems which are currently saved in the local non-volatile cache, and providing a menu to the user of the computerized device, the menu prompting the user to select, from the operating system list, the particular available main operating system for booting on the computerized device.

12. An electronic apparatus, comprising:

a network interface constructed and arranged to connect to a network;

memory; and processing circuitry coupled to the network interface and the memory, the memory storing instructions which, when carried out by the processing circuitry, cause the processing circuitry to:

while the processing circuitry operates as a preboot execution environment (PXE) protocol client, load a limited boot image from a PXE server over the network, the limited boot image being a lightweight operating system;

execute the limited boot image loaded from the PXE server to operate the electronic apparatus as an advanced protocol provisioned client, and while the processing circuitry executes the limited boot image to operate the electronic apparatus as the advanced protocol provisioned client, download a main operating system into the memory from an operating system server over the network, the main operating system being a comprehensive operating system;

wherein the main operating system is a particular main operating system;

wherein downloading the main operating system into the local memory further includes:

prior to retrieving the particular main operating system from the operating system server, performing a search operation based on a name and version to search a local non volatile cache for an intact copy of the particular main operating system, a result of the search operation indicating that an intact copy of the particular main operating system is not currently stored in the local non volatile cache;

and wherein retrieving the particular main operating system from the operating system server is performed in response to the result of the search operation indicating that an intact copy of the particular main operating system is not currently stored in the local non volatile cache.

13. An electronic apparatus as in claim 12 wherein the processing circuitry, when loading the limited boot image from the PXE server over the network, is constructed and arranged to retrieve the limited boot image from the PXE server using Trivial File Transfer Protocol (TFTP); and wherein the processing circuitry, when downloading the main operating system into the local memory from the operating system server over the network, is constructed and arranged to obtain the main operating system from the operating system server using File Transfer Protocol (FTP) which is different than TFTP.

14. An electronic apparatus as in claim 13 wherein the processing circuitry is further constructed and arranged to:

after loading the local copy of the limited boot image from the local non-volatile cache to operate the computerized device as the advanced protocol provisioned client, output an operating system list to a user of the computerized device, the operating system list identifying available main operating systems which are currently saved in the local non-volatile cache, and provide a menu to the user of the computerized device, the menu prompting the user to select, from the operating system list, the particular available main operating system for booting on the computerized device.

15. A computer program product having a non-transitory computer readable medium which stores a set of instructions to provision a computerized device with a main operating system, the set of instructions, when carried out by computerized circuitry of the computerized device, causing the computerized circuitry to perform a method of:

while computerized circuitry operates as a preboot execution environment (PXE) protocol client, loading, by the computerized circuitry, a limited boot image from a PXE server over a network, the limited boot image being a lightweight operating system;

executing, by the computerized circuitry, the limited boot image loaded from the PXE server to operate the computerized device as an advanced protocol provisioned client; and while the computerized circuitry executes the limited boot image to operate the computerized device as the advanced protocol provisioned client, downloading, by the computerized circuitry, the main operating system into local memory from an operating system server over the network, the main operating system being a comprehensive operating system;

wherein the main operating system is a particular main operating system;

wherein downloading the main operating system into the local memory further includes:

prior to retrieving the particular main operating system from the operating system server, performing a search operation based on a name and version to search a local non volatile cache for an intact copy of the particular main operating system, a result of the search operation indicating that an intact copy of the particular main operating system is not currently stored in the local non volatile cache;

and wherein retrieving the particular main operating system from the operating system server is performed in response to the result of the search operation indicating that an intact copy of the particular main operating system is not currently stored in the local non volatile cache.

16. An electronic apparatus as in claim 12 wherein downloading the main operating system into the local memory further includes:

prior to retrieving the particular main operating system from the operating system server, performing a search operation which, based on the name and the version, to search the local non-volatile cache for an intact copy of the particular main operating system, a result of the search operation indicating that an intact copy of the particular main operating system is not currently stored in the local non-volatile cache;

and wherein retrieving the particular main operating system from the operating system server is performed in response to the result of the search operation indicating that an intact copy of the particular main operating system is not currently stored in the local non-volatile cache.

17. An electronic apparatus as in claim 16 wherein performing the search operation includes:

finding a corrupted copy of the particular main operating system in the local non-volatile cache, and performing a signature verification operation on the corrupted copy of the particular main operating system, the signature verification operation providing a signature value indicating that the corrupted copy of the particular main operating system is unsuitable for use by the computerized device;

and wherein retrieving the particular main operating system from the operating system server is performed in response to the signature value indicating that the corrupted copy of the particular main operating system is unsuitable for use by the computerized device.

18. A method as in claim 1 wherein detecting the network deficiency includes detecting current unavailability of the network.

19. A method as in claim 1 further including, in response to detection of the network deficiency, loading the local copy of the main operating system from the local non-volatile cache for execution by the computerized device.

20. A method as in claim 1 further comprising:

while loading the limited boot image from the PXE server over the network, saving a local copy of the limited boot image in a local non-volatile cache which is separate from the local memory;

while downloading the main operating system into the local memory from the operating system server over the network, saving a local copy of the main operating system in the local non-volatile cache;

after the computerized device has been rebooted, detecting a network deficiency; and in response to detection of the network deficiency, loading the local copy of the limited boot image from the local non-volatile cache to operate the computerized device as the advanced protocol provisioned client.

\* \* \* \* \*